United States Patent [19]

Yokota et al.

[11] 4,147,150
[45] Apr. 3, 1979

[54] INTERNAL COMBUSTION ENGINE WITH AN AUXILIARY COMBUSTION CHAMBER

[75] Inventors: Masato Yokota; Tetsuji Katayama, both of Susono, Japan

[73] Assignee: Toyota Jidosha Kogyo Kabushiki Kaisha, Toyota, Japan

[21] Appl. No.: 797,360

[22] Filed: May 16, 1977

[30] Foreign Application Priority Data

Dec. 21, 1976 [JP] Japan .................. 51-154496

[51] Int. Cl.² .................. F02B 19/18; F02B 23/08
[52] U.S. Cl. .................. 123/191 S; 123/32 C; 123/32 L; 123/191 SP
[58] Field of Search .......... 123/30 D, 32 K, 32 L, 123/32 ST, 32 SP, 191 S, 191 SP, 32 C

[56] References Cited

U.S. PATENT DOCUMENTS

| | | | |
|---|---|---|---|
| 3,968,782 | 7/1976 | Noguchi et al. | 123/32 K |
| 3,980,057 | 9/1976 | Sanda et al. | 123/191 S |
| 4,004,503 | 1/1977 | Nakamura et al. | 123/191 S |
| 4,029,075 | 6/1977 | Noguchi et al. | 123/32 SP |
| 4,038,959 | 8/1977 | Takizawa et al. | 123/191 SP |
| 4,041,909 | 8/1977 | Nakamura et al. | 123/191 S |
| 4,048,973 | 9/1977 | Sanda et al. | 123/191 S |
| 4,076,000 | 2/1978 | Goto et al. | 123/32 SP |
| 4,088,099 | 5/1978 | Gruden | 123/191 S |

*Primary Examiner*—Charles J. Myhre
*Assistant Examiner*—Craig R. Feinberg
*Attorney, Agent, or Firm*—Stevens, Davis, Miller & Mosher

[57] ABSTRACT

Disclosed is an internal combustion engine comprising a main combustion chamber and an auxiliary combustion chamber which are interconnected with each other via a first connecting passage. A second connecting passage communicating the first connecting passage with the main combustion chamber is further provided. The spark plug is disposed in the second connecting passage. The combustible mixture in the main combustion chamber passes through the second connecting passage due to the pressure difference between the static pressure at a position where the second connecting passage opens into the first connecting passage and the static pressure at a position where the second connecting passage opens into the main combustion chamber.

12 Claims, 8 Drawing Figures

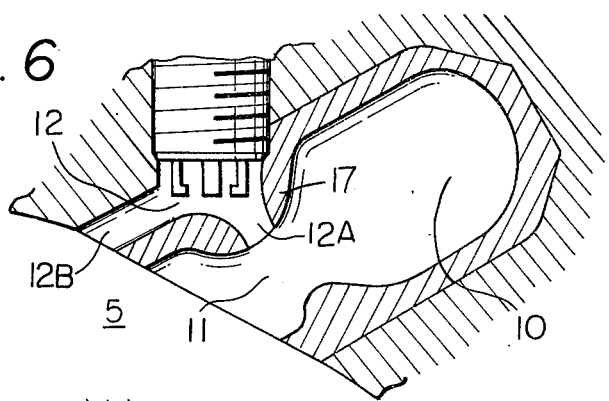
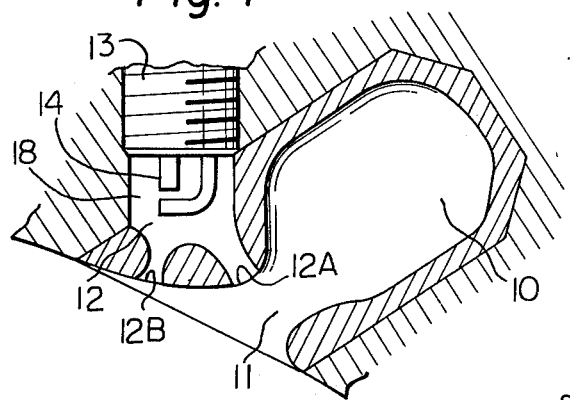
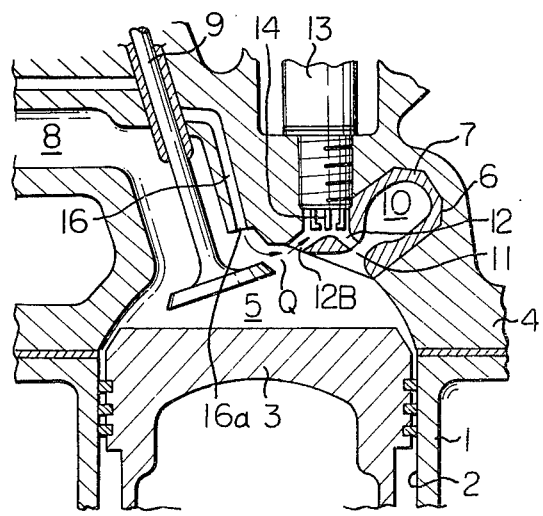

INTERNAL COMBUSTION ENGINE WITH AN AUXILIARY COMBUSTION CHAMBER

DESCRIPTION OF THE INVENTION

The present invention relates to an internal combustion engine with an auxiliary combustion chamber.

In order to reduce the amount of harmful HC, CO and $NO_x$ components in exhaust gas, there has been known a method for burning a lean air-fuel mixture or a mixture containing recirculated exhaust gas therein. As a typical internal combustion engine adopting the above-mentioned method, there has been proposed an internal combustion engine in which a combustion chamber comprises a main combustion chamber and an auxiliary combustion chamber which are interconnected with each other via a single connecting passage, and the electrode of a spark plug is located in the connecting passage. In this engine, at the time of the intake stroke, a lean air-fuel mixture or an air-fuel mixture containing recirculated exhaust gas therein is introduced into the main combustion chamber via the intake valve. Then, at the time of the compression stroke, the combustible mixture introduced into the main combustion chamber is forced into the auxiliary combustion chamber. At this time, the residual exhaust gas created by the combustion in the preceeding cycle and remaining around the electrode of the spark plug is scavenged by the combustible mixture forced into the auxiliary combustion chamber. Then, the combustible mixture in the connecting passage is ignited by the spark plug before the piston reaches the top dead center and, thus, a flame core is created in the connecting passage. Then, the flame enters into the auxiliary combustion chamber together with the combustible mixture stream and propagates into the entire space of the auxiliary combustion chamber, thus causing the rapid combustion of the combustible mixture in the auxiliary combustion chamber. After this, the burning jet is injected into the main combustion chamber via the connecting passage forming a restricted opening and causes the turbulence of the combustible mixture in the main combustion chamber. As a result of this, turbulent burning is caused in the main combustion chamber.

In an internal combustion engine of the above described type having no additional intake valve in the auxiliary combustion engine, since a positive scavenging operation of the residual exhaust gas in the auxiliary combustion chamber cannot be effected, a large amount of the combustion gas created by the combustion in the preceding cycle remains in the auxiliary combustion chamber as a residual exhaust gas. Consequently, if the electrode of the spark plug is located in the auxiliary combustion chamber, an easy ignition can not be obtained due to the presence of the residual exhaust gas. In addition, a combustible mixture such as a lean air-fuel mixture and an air-fuel mixture containing recirculated exhaust gas therein can not be easily ignited. As a result, misfiring occurs. In order to avoid this problem, in an internal combustion engine of the above-mentioned type, the spark gap of the spark plug is located in the connecting passage. Consequently, even if the residual exhaust gas remains around the spark gap of the spark plug, this residual exhaust gas is scavenged by the combustible mixture and forced into the auxiliary combustion chamber at the time of the compression stroke. As a result of this, only a combustible mixture exists around the spark gap of the spark plug and the combustible mixture can be easily ignited.

By positioning the spark gap of the spark plug in the connecting passage, it is true that ignition is improved as mentioned above. However, when the engine is operating at a high number of revolutions per minute and when the ignition timing is advanced, the velocity of the combustible mixture flowing in the connecting passage at the time of ignition is extremely increased and sometimes reaches a velocity near the speed of the sound. Consequently, discharging arc created in the spark gap of the spark plug is extinguished by the high speed stream of the combustible mixture and, even if the combustible mixture is ignited, the flame core can not grow, thereby causing a misfire.

An object of the present invention is to provide an internal combustion engine with an auxiliary combustion chamber capable of preventing the occurrence of misfire when the engine is operating at a high speed and when the ignition timing is advanced.

According to the present invention, there is provided an internal combustion engine comprising: a cylinder block having a cylinder bore therein; a cylinder head mounted on said cylinder block and having therein a cavity defining an auxiliary combustion chamber; a piston reciprocally movable in said cylinder bore, said piston and said cylinder head forming a main combustion chamber therebetween; an intake valve movably mounted on said cylinder head for leading a combustible mixture into said main combustion chamber; an exhaust valve movably mounted on said cylinder head for discharging an exhaust gas into the atmosphere; a first connecting passage disposed in said cylinder head and communicating said auxiliary combustion chamber with said main combustion chamber; a second connecting passage disposed in said cylinder head, which has a first open end opening into said first connecting passage and has a second open end opening into the region consisting of said main combustion chamber and of said first connecting passage located between said main combustion chamber and said first open end, the static pressure in said region at the time of the compression stroke being higher than that at said first open end, and; a spark plug having a spark gap located in said second connecting passage.

The present invention may be more fully understood from the description set forth below of preferred embodiments of the invention, together with the accompanying drawings.

BRIEF DESCRIPTION OF THE DRAWINGS

In the drawings:

FIG. 6 is an enlarged view of a still further embodiment according to the present invention;

FIG. 7 is an enlarged view of a still further embodiment according to the present invention, and;

FIG. 8 is a schematic cross-sectional side view of a still further embodiment according to the present invention.

DESCRIPTION OF PREFERRED EMBODIMENTS

Figure 1:
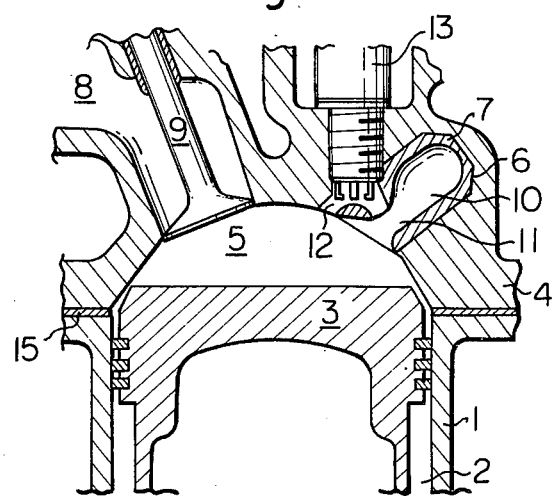
FIG. 1 is a schematic cross-sectional side view of an embodiment according to the present invention.
Figure 2:
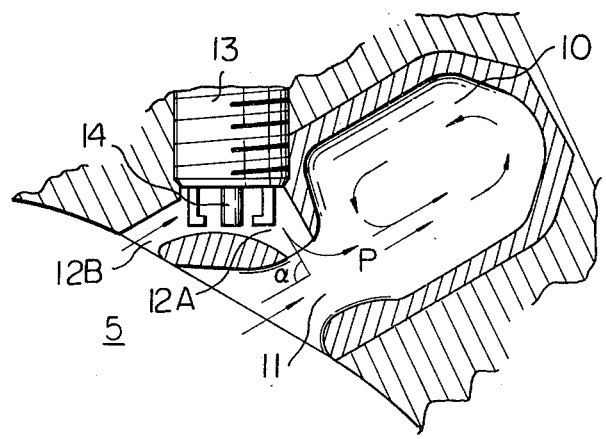
FIG. 2 is an enlarged view showing the auxiliary combustion chamber in FIG. 1.

FIGS. 1 and 2 show a first embodiment of an internal combustion engine with an auxiliary combustion chamber according to the present invention. In FIGS. 1 and 2, 1 designates a cylinder block, 3 a piston reciprocally movable in a cylinder bore 2 formed in the cylinder block 1, 4 a cylinder head fixed onto the cylinder block 1 via a gasket 15, 5 a main combustion chamber formed between the piston 3 and the cylinder head 4, 9 an intake valve for leading a combustible mixture from an intake port 8 into the main combustion chamber 5, 10 an auxiliary combustion chamber formed in an auxiliary chamber component 7 which is press-fitted into a recess 6 formed in the cylinder head 4. A first connecting passage 11 communicating the auxiliary combustion chamber 10 and the main combustion chamber 5 is formed in the auxiliary chamber component 7. In addition, an exhaust valve (not shown) is provided for discharging the exhaust gas from the main combustion chamber 5 into the atmosphere. A second connecting passage 12 communicating the first connecting passage 11 with the main combustion chamber 5 is further formed in the auxiliary chamber component 7. The electrode 14 of a spark plug 13 is located in the second connecting passage 12. The first connecting passage 11 is formed in Laval pipe shape, i.e. the first connecting passage 11 has a middle portion of smallest cross-sectional area and a cross-sectional area which is gradually and smoothly increased towards the opposite open ends of the first connecting passage 11. As is shown in FIG. 2, one end 12A of the second connecting passage 12 opens into the middle portion of the first connecting passage 11, with the smallest cross-sectional area, and the other end 12B of the second connecting passage 12 opens into the main combustion chamber 5 at a position near the periphery of the open end of the first connecting passage 11. In addition, as is shown in FIG. 2, the second connecting passage 12 is formed in an L-like shape and is constructed so that its open end 12B has a cross-sectional area which is smaller than the cross-sectional area of the first connecting passage 11. Consequently, the combustible mixture introduced into the main combustion chamber 5 via the intake valve 9 is mainly forced into the auxiliary combustion chamber 10 via the first connecting passage 11 at the time of the compression stroke. In an internal combustion engine of this type, the middle portion of the first connecting passage 11 is appropriately narrowed so as to have a cross-sectional area necessary to obtain a strong burning jet. Consequently, the velocity of the combustible mixture forced into the auxiliary combustion chamber 10 becomes extremely high at the middle portion of the first connecting passage 11. Therefore, since the static pressure at the middle portion of the first connecting passage is decreased by a value corresponding to the increase in the dynamic pressure, the static pressure in the first connecting passage 11 is lowered considerably. As a result of this, the static pressure at a position near the open end 12A of the second connecting passage 12 is also lowered. Contrary to this, the open end 12B of the second connecting passage 12 opens into the main combustion chamber 5, and the velocity of the combustible mixture flowing in the main combustion chamber 5 at a position near the open end 12B is extremely smaller than that of the combustible mixture flowing in the middle portion of the first connecting passage 11. Consequently, the static pressure at a position near the open end 12B is large compared with that at a position near the open end 12A. Therefore, a large pressure difference is created between the static pressure in the open end 12A and the static pressure in the open end 12B, and as a result, the combustible mixture in the main combustion chamber 5 flows into the auxiliary combustion chamber 10 via the second connecting passage 12 due to the above-mentioned pressure difference.

In view of the above it will be understood that the following various effects are advantageously provided by the present invention.

(i) The residual exhaust gas remaining around the electrode 14 of the spark plug is scavenged by the combustible mixture flowing in the second connecting passage 12 at the time of the compression stroke.

(ii) The second connecting passage 12 is arranged so that, at the time of the compression stroke, the combustible mixture flowing out from the open end 12A of the second connecting passage 12 serves to deflect the flow direction of the combustible mixture flowing in the first connecting passage 11 as is shown by the arrow P and as a result, the combustible mixture flows in the auxiliary combustion chamber 10 along the inner wall of the auxiliary combustion chamber 10. Therefore, a strong swirl motion is caused in the auxiliary combustion chamber 10 at the time of the compression stroke and, as a result, the speed of combustion in the auxiliary combustion chamber 10 is increased.

(iii) As is shown in FIG. 2, the second connecting passage 12 is so arranged that the combustible mixture swirling in the auxiliary combustion chamber 10 does not directly enter into the second connecting passage 12 via the open end 12A. Consequently, there is no such problem that the residual exhaust gas removed from the space around the electrode 14 of the spark plug 13 and introduced into the auxiliary combustion chamber 10 is again returned to the space around the electrode 14 of the spark plug 13.

(iv) As is shown in FIG. 2, the angle between the axis of the first connecting passage 11 and the axis of the second connecting passage 12 at the open end 12A is approximately a right angle. By having these axes form an approximately right angle, since a large part of the burning jet is injected into the main combustion chamber 5 from the auxiliary combustion chamber 10 via the first connecting passage 11, a strong burning jet can be obtained. In addition, a part of the burning jet passes through the second connecting passage 12. As a result of this, the carbon stuck to the electrode 14 of the spark plug 13 can be burned by the burning jet passing through the second connecting passage 12.

(v) The first connecting passage 11 is formed in the Laval pipe shape so that its cross-sectional area is increased towards the main combustion chamber 5. As a result of this, since the burning jet moving forward in the first connecting passage 11 at a position near the inner wall of the first connecting passage 11 has a tendency to move along the inner wall of the first connecting passage 11, the burning jet injected into the main combustion chamber 5 can uniformly spread over the entire space of the main combustion chamber 5.

Figure 3:
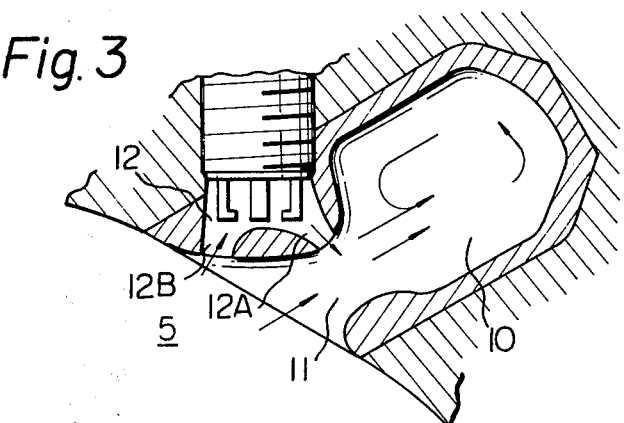
FIG. 3 is an enlarged view of another embodiment according to the present invention.

FIGS. 3 through 8 show separate embodiments according to the present invention. Referring to FIG. 3, the second connecting passage 12 is so constructed that its open end 12B opens into the first connecting passage 11 on the inner wall thereof at a position located between the main combustion chamber 5 and the middle portion of the first connecting passage 11. In this case, the velocity of the combustible mixture at a position near the open end 12B is higher than that at a position near the open end 12B in the embodiment shown in FIG. 2. Therefore, in this embodiment, since the static pressure at a position near the open end 12B is relatively small, the pressure difference between the static pressure at the open end 12A and the static pressure at the open end 12B is smaller than that in the embodiment shown in FIG. 2. This results in reducing the velocity of the combustible mixture flowing in the second connecting passage 12, thereby further inproving ignition.

Figure 4:
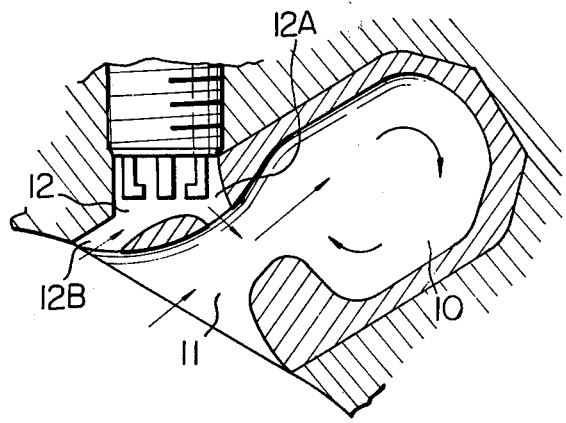
FIG. 4 is an enlarged view of a further embodiment according to the present invention.

In the embodiment shown in FIG. 4, the first connecting passage 11 is so arranged that the combustible mixture forced into the auxiliary combustion chamber 10 is swirled in the direction reverse to that in the embodiment shown in FIG. 2.

Figure 5:
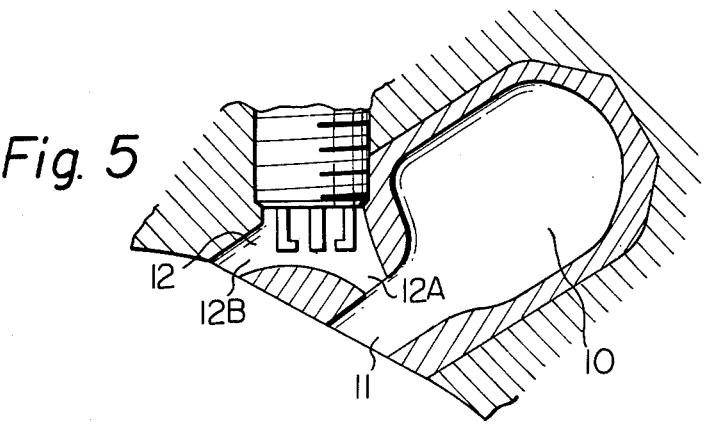
FIG. 5 is an enlarged view of a still further embodiment according to the present invention.

FIG. 5 shows the case wherein the first connecting passage 11 has a uniform cross-sectional area.

In the embodiment shown in FIG. 6, an annular raised portion 17 is formed on the inner wall of the first connecting passage 11 having a uniform cross-sectional area as shown in FIG. 5. Consequently, this first connecting passage 11 has a portion located near the main combustion chamber 5 and having a uniform cross-sectional area. In this embodiment, the annular raised portion 17 forms a restricted opening having a cross-sectional area necessary to obtain a strong burning jet, and the second connecting passage 12 is formed in the annular raised portion 17 so that the open end 12A opens into the restricted opening.

In the embodiment shown in FIG. 7, the middle portion of the second connecting passage 12 is enlarged so as to form a chamber 18 having a relatively large volume, and the electrode 14 of the spark plug 13 is located in the chamber 18. In this embodiment, the speed of the combustible mixture flowing around the electrode 14 of the spark plug 13 at the time of the compression stroke is lower than that in any other embodiment, thereby improving ignition.

In the embodiment shown in FIG. 8, a rich air-fuel mixture supply passage 16 is formed in the cylinder head 4. This supply passage 16 has an opening 16a which opens into the main combustion chamber 5 in the vicinity of the open end 12B of the second connecting passage 12 when the intake valve 9 is opened as is shown in FIG. 8. However, this opening 16a of the rich air-fuel mixture supply passage 16 remains closed by the rear surface of the valve head of the intake valve 9 when the intake valve 9 is in the closed position. In this embodiment, the flow direction of a rich air-fuel mixture sucked out from the opening 16a into the main combustion chamber is deflected by the rear surface of the valve head of the intake valve as shown by the arrow Q in FIG. 8 and, then, the rich air-fuel mixture is introduced into the space around the electrode 14 of the spark plug 13 via the second connecting passage 12. As a result of this, the electrode 14 of the spark plug 13 is enclosed by the rich air-fuel mixture at the time of ignition, whereby ignition can be extremely improved.

According to the present invention, at least one of the open ends of the second connecting passage opens into the first connecting passage, while the other open end of the second connecting passage opens into the region in which the static pressure is higher than that at the open end opening into the first connecting passage. In addition, the electrode of the spark plug is located in the second connecting passage. As a result of this, the velocity of the combustible mixture flowing around the electrode of the spark plug is extremely reduced compared to the case wherein the electrode of the spark plug is located in the first connecting passage as in a conventional engine. In addition, the residual exhaust gas remaining around the electrode of the spark plug is fully scavenged by the combustible mixture flowing in the second connecting passage at the time of the compression stroke. Consequently, in the engine according to the present invention, ignition can be extremely improved. Furthermore, since a part of the flame injected into the main combustion chamber via the first connecting passage reaches the electrode of the spark plug, the carbon stuck on the electrode is burned and removed. In addition, since the electrode of the spark plug is not directly exposed to the burning jet flowing in the first connecting passage and having a high temperature, melting of the electrode can be prevented.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising:
   a cylinder block having a cylinder bore therein;
   a cylinder head mounted on said cylinder block and having therein a cavity defining an auxiliary combustion chamber;
   a piston reciprocally movable in said cylinder bore, said piston and said cylinder head defining a main combustion chamber therebetween;
   an intake valve movably mounted on said cylinder head for opening an intake passage for introducing a combustible mixture into said main combustion chamber;
   a first connecting passage in said cylinder head and directly fluidly communicating said auxiliary combustion chamber with said main combustion chamber;
   a second connecting passage in said cylinder head, said second passage having a first end opening directly transversely into said first passage between the ends thereof and a second opposite end opening directly into said main combustion chamber; and
   a spark plug having a spark gap in said second passage.

2. An internal combustion engine as claimed in claim 1, wherein:
   said second passage comprises a first substantially straight passageway which terminates in said first end and a second substantially straight passageway which terminates in said second end, said passageways being directly fluidly connected and intersecting at an angle of approximately 90° relative to each other; and
   said spark gap is in the area of the intersection of said passageways.

3. An internal combustion engine comprising:
   a cylinder block having a cylinder bore therein;
   a cylinder head mounted on said cylinder block and having therein a cavity defining an auxiliary combustion chamber;

a piston reciprocally movable in said cylinder bore, said piston and said cylinder head defining a main combustion chamber therebetween;

an intake valve movably mounted on said cylinder head for opening an intake passage for introducing a combustible mixture into said main combustion chamber;

a first connecting passage in said cylinder head and directly fluidly communicating said auxiliary combustion chamber with said main combustion chamber, said first passage having a substantially uniform transverse cross-sectional area which is smaller than the transverse cross-sectional area of the auxiliary combustion chamber;

a second connecting passage in said cylinder head, said second passage having a first end opening transversely directly into said first passage between opposite ends of said first passage, and a second opposite end opening directly into said main combustion chamber; and a spark plug having a spark gap in said second passage.

4. An internal combustion engine comprising:

a cylinder block having a cylinder bore therein;

a cylinder head mounted on said cylinder block and having therein a cavity defining an auxiliary combustion chamber;

a piston reciprocally movable in said cylinder bore, said piston and said cylinder head defining a main combustion chamber therebetween;

an intake valve movably mounted on said cylinder head for opening an intake passage for introducing a combustible mixture into said main combustion chamber;

a first connecting passage in said cylinder and directly fluidly communicating said auxiliary combustion chamber with said main combustion chamber, said first passage having a reduced portion of minimal transverse cross-sectional area between the ends thereof and progressively increasing in transverse cross-sectional area from the reduced portion to the opposite ends thereof;

a second connecting passage in said cylinder head, said second passage having a first end opening directly transversely into the reduced portion of said first passage between the ends of said first passage and a second opposite end opening directly into said main combustion chamber; and a spark plug having a spark gap in said second passage.

5. An internal combustion engine comprising:

a cylinder block having a cylinder bore therein;

a cylinder head mounted on said cylinder block and having therein a cavity defining an auxiliary combustion chamber;

a piston reciprocally movable in said cylinder bore, said piston and said cylinder head defining a main combustion chamber therebetween;

an intake valve movable mounted on said cylinder head for opening an intake passage for introducing a combustible mixture into said main combustion chamber;

a first connecting passage in said cylinder head and directly fluidly communicating said auxiliary combustion chamber with said main combustion chamber, said first passage having a reduced portion of minimal transverse cross-sectional area between the ends thereof and progressively increasing in transverse cross-sectional area from the reduced portion to the opposite ends thereof;

a second connecting passage in said cylinder head, said second passage having a first end opening directly transversely into the reduced portion of said first passage between the ends thereof and a second opposite end opening directly into said first passage between said main combustion chamber and said first end; and a spark plug having a spark gap in said second passage.

6. An internal combustion engine comprising:

A cylinder block having a cylinder bore therein;

a cylinder head mounted on said cylinder block and having therein a cavity defining an auxiliary combustion chamber;

a piston reciprocally movable in said cylinder bore, said piston and said cylinder head defining a main combustion chamber therebetween;

an intake valve movably mounted on said cylinder head for opening an intake passage for introducing a combustible mixture into said main combustion chamber;

a first connecting passage in said cylinder head and directly fluidly communicating said auxiliary combustion chamber with said main combustion chamber, said first passage having a reduced diameter portion between its opposite ends, said first passage having a minimal transverse cross-sectional area which is smaller than the transverse cross-sectional area of the auxiliary combustion chamber;

a second connecting passage in said cylinder head, said second passage having a first end opening transversely directly into said reduced diameter portion and having a second opposite end opening directly into said first passage in a region thereof between said main combustion chamber and said first end; and a spark plug having a spark gap in said second passage.

7. An internal combustion engine as claimed in claim 5, wherein an enlarged passage portion is formed in said second connecting passage, the spark gap of said spark plug being located in said enlarged passage portion.

8. An internal combustion engine comprising:

a cylinder block having a cylinder bore therein;

a cylinder head mounted on said cylinder block and having therein a cavity defining an auxiliary combustion chamber;

a piston reciprocally movable in said cylinder bore, said piston and said cylinder head defining a main combustion chamber therebetween;

an intake valve movably mounted on said cylinder head for opening an intake passage for introducing a combustible mixture into said main combustion chamber;

a first connecting passage in said cylinder head and directly fluidly communicating said auxiliary combustion chamber with said main combustion chamber;

a second connecting passage in said cylinder head, said second passage having a first end opening directly transversely into said first passage between the ends thereof and a second opposite end opening directly into said first passage between said main combustion chamber and said first end; and a spark plug having a spark gap in said second passage.

9. An internal combustion engine as claimed in claim 8, wherein:
said second passage comprises a first substantially straight passageway which terminates in said first end and a second substantially straight passageway which terminates in said second end, said passageways being directly fluidly connected and intersecting at an angle of approximately 90° relative to each other; and
said spark gap is in the area of intersection of said passageways.

10. An internal combustion engine comprising:
a cylinder block having a cylinder bore therein;
a cylinder head mounted on said cylinder block and having therein a cavity defining an auxiliary combustion chamber;
a piston reciprocally movable in said cylinder bore, said piston and said cylinder head defining a main combustion chamber therebetween;
an intake valve movably mounted on said cylinder head for opening an intake passage for introducing a combustible mixture into said main combustion chamber;
a first connecting passage in said cylinder head and directly fluidly communicating said auxiliary combustion chamber with said main combustion chamber, said first passage having a reduced diameter portion between its opposite ends, said first passage having a minimal transverse cross-sectional area which is smaller than the transverse cross-sectional area of the auxiliary combustion chamber;
a second connecting passage in said cylinder head, said second passage having a first end opening transversely directly into said reduced diameter portion and having a second opposite end opening directly into said main combustion chamber; and
a spark plug having a spark gap in said second passage.

11. An internal combustion engine as claimed in claim 10, wherein said intake valve has a valve head having a rear surface and having a front surface exposed to said main combustion chamber, said engine further comprising a rich air-fuel mixture feed passage having an opening which opens into said main combustion chamber in the vicinity of the second open end of said second connecting passage when said intake valve is opened, the opening of said rich air-fuel mixture feed passage being closed by the rear surface of the valve head of said intake valve when said intake valve is in the closed position.

12. An internal combustion engine as claimed in claim 10, wherein:
the one end of said second passage opens into said reduced diameter portion at an angle of approximately 90° relative to the axis of the first passage.

* * * * *